United States Patent [19]

Miller

[11] 3,739,129
[45] June 12, 1973

[54] TUBE WELDING APPARATUS AND METHOD
[75] Inventor: Norman K. Miller, Concordville, Pa.
[73] Assignee: Miller Brothers, Concordville, Pa.
[22] Filed: Nov. 26, 1971
[21] Appl. No.: 202,322

[52] U.S. Cl. ............ 219/10.53, 156/203, 156/466, 219/10.69, 219/10.81
[51] Int. Cl. .............................................. H05b 9/04
[58] Field of Search ............ 219/10.53, 6.5, 10.57, 219/10.69, 10.73, 10.81, 10.79, 50; 156/203, 466

[56] References Cited
UNITED STATES PATENTS
3,388,017 6/1968 Grimsley et al..................... 156/203
2,631,509 3/1953 Whytlaw......................... 156/466 X
2,697,773 12/1954 Gordon......................... 219/10.53 X
3,162,561 12/1964 Farkas....................... 219/10.53 UX
3,461,014 8/1969 James ............................ 219/10.53
2,570,921 10/1951 Collins............................ 219/10.53
3,207,651 9/1965 Hood et al...................... 156/203 X
3,495,505 2/1970 Hansson et al. ................ 156/466 X Primary Examiner—J. V. Truhe
Assistant Examiner—B. A. Reynolds
Attorney—Robert K. Youtie

[57] ABSTRACT

Apparatus and method wherein a web of material to be welded is longitudinally fed and simultaneously constrained to a transversely concave configuration, encompassing an arbor or support in the concave relation with web margins overlapping, and welding means welding the overlapping margins in cooperation with the supporting arbor.

9 Claims, 4 Drawing Figures

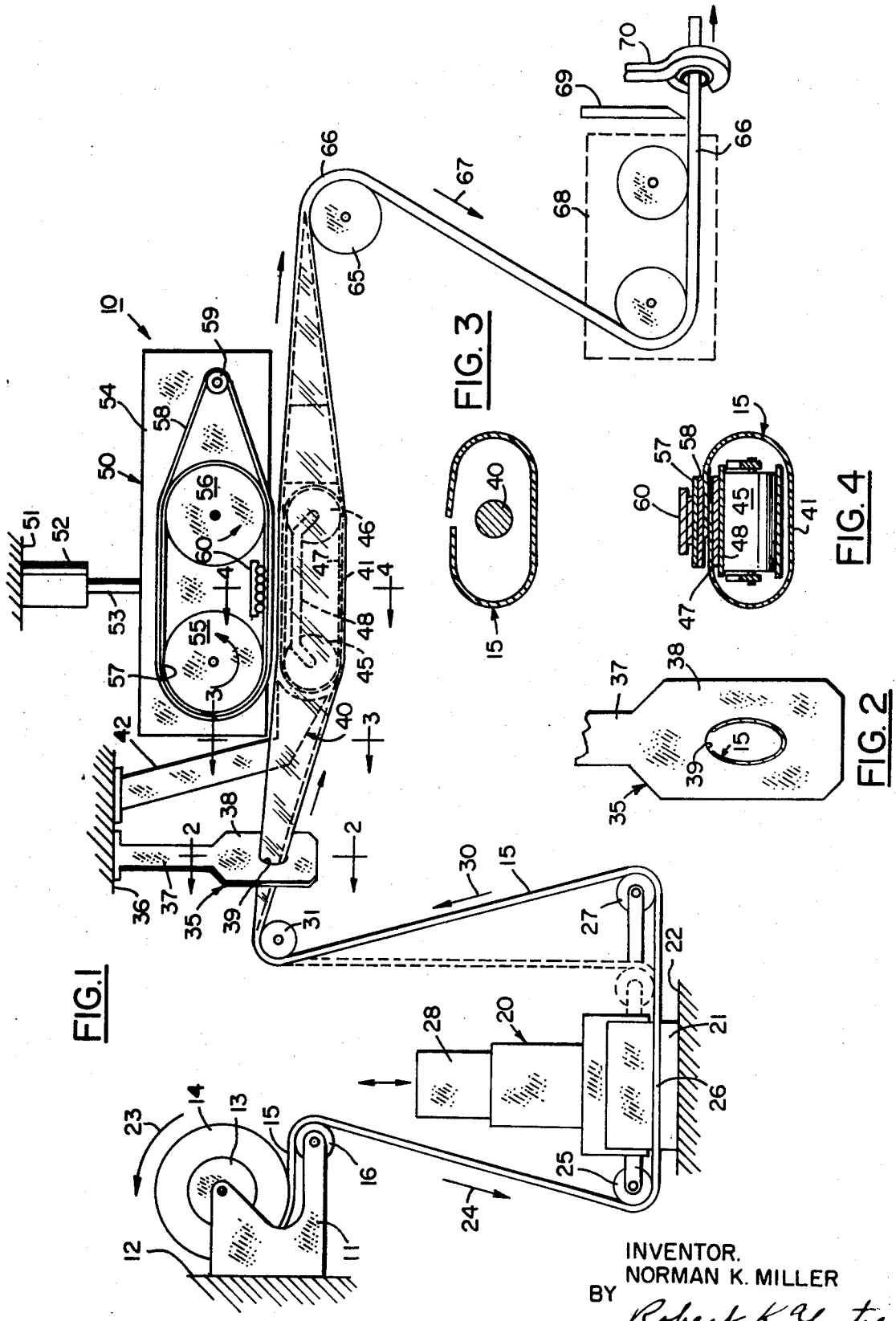

3,739,129

TUBE WELDING APPARATUS AND METHOD

BACKGROUND OF THE INVENTION

While there are, in the prior art, various proposed means for forming flexible tubing, such previous proposals are not entirely satisfactory in the formation of of highly durable and entirely reliable tubing, such as necessarily required for packaging of particulate explosives, and the like.

SUMMARY OF THE INVENTION

It is, therefore, an important object of the present invention to provide a unique and highly improved apparatus for welding flexible plastic tubing, which apparatus is relatively simple in arrangement and operation, being durable and reliable throughout a long useful life, and which economically produces welded plastic tubing of high quality capable of use under extreme operating conditions.

It is a further object of the present invention to provide a method of tube welding which is extremely simple and economical, being relatively rapid in operation, and requiring relatively little capital expenditure.

Other objects of the present invention will become apparent upon reading the following specification and referring to the accompanying drawings, which form a material part of this disclosure.

The invention accordingly consists in the features of construction, combinations and arrangements of method steps, which will be exemplified in the following description, and of which the scope will be indicated by the appended claims.

BRIEF DESCRIPTION OF THE DRAWINGS

FIG. 1 is a somewhat diagrammatic representation showing apparatus of the present invention practicing the instant method in the manufacture of welded tubing.

FIG. 2 is a partial sectional view taken generally along the line 2—2 of FIG. 1.

FIG. 3 is a partial sectional elevational view taken generally along the line 3—3 of FIG. 1.

FIG. 4 is a partial sectional view taken generally along the line 4—4 of FIG. 1.

DESCRIPTION OF THE PREFERRED EMBODIMENT

Referring now more particularly to the drawings, and specifically to FIG. 1 thereof, the apparatus there illustrated is generally designated 10, and is adapted to produce welded tubing in accordance with the teachings of the present invention.

The tube welding apparatus 10 may include a reel holder or support 11 which is suitably mounted on a fixed surface 12 and rotatably carries a spool 13 about which is wound a coil 14 of flexible material 15 to be welded. That is, the material 15 is of flexible plastic, and of weldable nature, such as by thermal or radiofrequency energy. Many thermoplastics are suitable, and the plastic web 15 may extend from the coil 14 over an idler roll 16.

A web printing device is generally designated 20, and may include a base 21 mounted on a fixed supporting surface 22. The plastic web 15, unwinding from the coil 14 in the direction of arrow 23, and thence passing over idler roll 16 and downwardly in the direction of arrow 24, passes thence generally horizontally across the base or platen 21 of the printing mechanism. More specifically, the printing mechanism 21 includes an inlet guide roller 25, beneath which the web 15 passes and from which the web extends generally horizontally, as at 26, across the printing mechanism base or platen 21. At the outlet side of the printing mechanism 20, the right-hand side as seen in FIG. 1, there is provided an additional or outlet roll 27, about which the web passes and from which it extends generally upwardly. The roll 27 is shiftable, as between the horizontally spaced solid line and dashed line positions.

Mounted in the printing mechanism 20, for reciprocatory movement toward and away from the platen 21, is a type carrier 28, which is moved by suitable operating means (not shown) into and out of printing engagement with the plastic web region 26, while the latter is supported firmly against the platen or base 21.

As will appear presently, the web 15 is drawn uniformly, or at a substantially constant linear velocity, by means downstream of the printing mechanism 20, but the web necessarily moves intermittently through the printing mechanism by reason of the printing action. Hence, the reciprocatory roller 27 serves to shift outwardly or rightwardly during movement of web region 26 through the printing mechanism, and the roller shifts leftwardly during the printing action when the web region 26 remains momentarily stationary. Thus, the reciprocatory roller 27 serves to take up any slack in the web, and assure proper tension in the web at all times.

The flexible plastic web 15 may pass from the takeup roller 27 in the direction of arrow 30, and thence over an idler roll 31 for continued movement through subsequent operations.

Downstream of roller 31, there is provided a web guide 35, which may be mounted by fastening to any suitable fixed surface, as at 36. The guide 35 may extend from the surface 36, as by arm 37, and terminate in an enlarged end region 38 having a through hole 39. The hole 39 is sized and configured to present an arcuately smooth concave surface or edge, along which the web 15 moves or slides and which constrains the web to a similar transversely arcuate, concave configuration. This is best seen in FIG. 2, the guide hole or opening 39 being circular or ovaloid, and the plastic web 15 engaging the bounding edge of the guide opening, except for the uppermost region thereof. Thus, the web 15 is constrained to a generally U-shaped or upwardly opening arcuately concave contour.

While the web guide 35 is illustrated as being fixed in position and of a fixed size and shape of opening 39, it is appreciated that the guide 35 may be removable and replaceable, if desired, and the guide opening 39 may be of selectively changeable size and configuration, as desired.

Downstream of the guide 35, there is provided a work-supporting arbor or mandrel 40 which is located within the concavity or hollow of the transversely curved web 15, at the web region 41. The arbor or mandrel 40 extends longitudinally within the web region 41, being supported by an arm or bracket 42 extending from the upstream end of the arbor exteriorly of the web 15 between the longitudinal edges thereof, for suitable mounting, as by affixation to the surface 36.

The arbor 40, being elongate in the direction of web movement, carries a pair of generally parallel rotatable members or rolls 45 and 46 extending generally horizontally and transversely of the arbor. An endless belt 47 is trained about the rotary members or rolls 45 and 46, having upper and lower runs extending longitudinally of the direction of web movement in the region 41. Specifically, the rolls 45 and 46 rotate in the clockwise direction, as seen in FIG. 1, so that the upper run of belt 45 moves in the direction of web movement, while the lower belt run moves opposite to belt movement. Supporting the upper run of endless arbor belt 47 is a fixed support member or backing plate 48, suitably attached to the arbor 40 by any desired means.

The rolls 45 and 46, and the associated endless belt 47 are therefore freely rotatable, the upper run of the belt being backed up by support member or plate 48 against downward forces.

Located adjacent to the arbor 40, along the path of web movement, is a welding unit, generally designated 50. In the illustrated embodiment, the welding unit 50 is arranged longitudinally of and above the arbor 40, for purposes appearing presently.

The welding unit 50 may be carried by suitable pressure-suspension means 52, 53, which may constitute a cylinder 52 depending from an overhead support 51, and a plunger 53 depending from the cylinder and resiliently biased downwardly therefrom. The plunger or piston rod 53 may carry the welding unit 50 and mount the latter in a resiliently downwardly biased relation over the rotary arbor mechanism 45-47.

More specifically, the welding unit 50 may include a mounting structure or plate 54, which may be disposed generally vertically and depend from the lower end of piston rod 53. Carried by the mounting structure 54 are a pair of rotary members or rolls 55 and 56, respectively located upstream and downstream along and over the arbor 40, being parallel to each other and rotatable about respective axes parallel to the axes of arbor rolls 45 and 46. Suitable drive means is connected in operative relation with at least one of the rolls 55, 56, and a synchronizing member or endless belt 57 is trained about the rolls for simultaneous rotation thereof, as in the directions indicated by the arrows. An additional endless belt 58 is trained about the rolls 55 and 56, say over the inner belt 57 and additionally about an idler roll 59 carried by the mounting structure 54. Provided interiorly within the belts 57 and 58, as between the rolls 55 and 56, adjacent to and directly over the lower run thereof, may be a welder proper 60, as of the radio-frequency type. The belts 57 and 58 are of suitable construction, as for passing the radio-frequency welding waves without adverse reaction thereto, such as suitable plastic, or other.

It will now be appreciated that the plastic web 15, after passing through the guide 35 which initiates the transversely arcuate, concave web configuration, continues downstream to the location of arbor rotary means 45, 46 where the web completely encompasses the arbor rotary means, as best seen in FIG. 4, with the longitudinal edge margins of the web extending laterally inwardly into overlapping relation in a sandwiched condition between the arbor belt 47 and the welding unit belt 58. That is, the overlapping longitudinal marginal regions of web 15 are held in their overlapping relation by the upper gripping action of the lower run of belt 58 and the upper run of belt 47. In this condition the overlapping margins are secured by welding, through the action of welding unit proper 60. Of course, this operation is continuous, and simultaneous with the drawing of the web 15 from its source to the welding station.

From the welding station, the longitudinally edge-welded web 15 passes downstream in its tubular form, the welded edge margins extending laterally in opposite directions across each other, so that the continuously formed tube passes, as at 66, about an idler roll 65, and thence through a withdrawing mechanism 68, as at 66.

Downstream of the withdrawing device 66 there may be a cut-off station 69, say a conventional shearing means, and an end fastening station 70. For example, the fastening station 70 may clinch or affix a hog ring to one end of each severed tubular length, so that the discharged lengths each define a receptacle or container.

From the foregoing, it is seen that the method and apparatus of the present invention provide means for uniquely producing flexible tubing in a highly reliable and economical manner, and which otherwise fully accomplish there intended objects.

Although the present invention has been described in some detail by way of illustration and example for purposes of clarity of understanding, it is understood that certain changes and modifications may be made within the spirit of the invention.

What is claimed is:

1. A tube welding apparatus comprising a support for a coil of flexible material to be welded, a guide downstream of said support and having a generally concave guide formation for passing therethrough a web of material from said support and flexing the material to a concave cross-sectional configuration, an arbor spaced downstream from said guide for engagement into the web concavity with the web extending entirely about the arbor and having its margins extending in opposite directions across each other on one side of the arbor, an endless arbor belt extending rotatably about said arbor for rolling engagement with said web margins on the inner side thereof, a welding unit located adjacent to said one arbor side for welding said web margins to define a tube, and an endless welding unit belt extending rotatably about said welding unit for rolling engagement with said web margins on the outer side thereof during said welding, said concave guide formation being smaller than said arbor and arbor belt to urge said web margins across each other.

2. A tube welding apparatus according to claim 1, said welding unit belt being rotatable about an axis transverse to said web for drawing engagement with said web.

3. A tube welding apparatus according to claim 1, wherein said web is flexed to face upwardly, said arbor depending into the web concavity with said margins overlapping each other on the upper side of said arbor, and said welding unit belt being rotatable about an axis transverse to said web for drawing engagement with said web.

4. A tube welding apparatus according to claim 1, in combination with a reciprocatory printer along the path of movement of said web upstream of said guide and shiftable transversely of the web into and out of printing engagement therewith, and yieldable roller means associated with said printer for withdrawing additional web to permit momentary web stoppage at the printer without stoppage at the welding unit.

5. A tube welder according to claim 4, in combination with a cut-off station downstream of said welding unit for severing the tube into predetermined lengths, and a fastening station associated with said cut-off station for closing one end of each severed tube length.

6. In the method of forming tubing of flexible weldable strip material, the steps which comprise: continuously longitudinally supplying a web of such material, flexing the web at an upstream location during said supplying into a concave cross-sectional configuration, locating an arbor interiorly of said concave cross-sectional configuration downstream of said location, further flexing said web at said location to a concave cross-sectional configuration smaller than that of said arbor so as to extend transversely entirely about said arbor with the web margins overlapping each other, and welding said overlapping margins together against said arbor during said supplying.

7. The method according to claim 6, further characterized in frictionally drawing said web to effect said supplying.

8. The method according to claim 6, further characterized in welding by radio-frequency energy.

9. The method according to claim 6, further characterized in effecting said flexing by constricting the web for passage through a concave guide.

* * * * *